Patented Aug. 3, 1937

2,088,831

UNITED STATES PATENT OFFICE 2,088,831

PROCESS OF TREATING FISH

Charles S. Ash and Per Berglund, San Francisco, Calif., assignors to California Packing Corporation, San Francisco, Calif., a corporation of New York No Drawing. Application October 24, 1932,
Serial No. 639,295

6 Claims. (Cl. 99—188)

This invention relates to a process of treating fish for canning or packing purposes and is particularly directed towards a method of treating sardines, herring and similar fish whereby the skins of the fish are rendered firm and the adherence of the skins of adjoining packed or canned fish is substantially prevented. The invention also relates to a process whereby the exudation of the adhesive and gluey material from the fish during sterilization and/or cooking of the fish in the cans is inhibited, whereby the adherence of the fish, and particularly the skins thereof, to the can is materially prevented.

As has been stated hereinbefore, the process of this invention is particularly adapted to the pre-treatment of sardines and other fish for canning treatment. The usual pre-canning treatment that has been practiced heretofore consists in general of the following steps:

The fish are cleaned and the cleaned fish are then brined so as to remove a good deal of the coagulated blood, etc. The washed and brined fish are then dried and after drying they are put through an oil bath maintained at a temperature slightly above the boiling point of water so that some of the water present in the fish is driven off. This treatment simultaneously cooks the fish and renders a certain amount of oil from the fish. After such oil treatment, the fish are cooled and allowed to drain. They are then packed into cans with either olive oil or some other vegetable oil, tomato sauce, mustard, or other condiment. The cans or other containers are then sealed and the sealed containers then subjected to a cooking or sterilizing operation.

This is an ideal method for preserving the skins and preventing sticking. This process has this disadvantage in any non-oil pack; both the taste and digestibility of the fish are impaired, especially in fat fish such as California sardines. The fish so prepared are too "rich", to be easily digested, so they "repeat". The oil bath imparts a rather rancid, oily taste to the non-oil pack fish which is objectionable. This taste is masked in the oil packed fish. Many attempts have been made to substitute another method for this unsatisfactory oil pre-treatment; that is, canning raw fish, pre-boiling in water, pre-boiling in salt solution, steaming, etc.

Even when this series of operations is carried out under the most favorable conditions, it has been found that the surfaces of the fish are coated with an agglutinant, adhesive or gluey substance which exudes from the fish during the cooking or sterilizing operation. This glue-containing substance which is exuded from the fish causes the fish to adhere to the can and to each other so that the consumer has difficulty in extracting whole and perfect fish from the container. The wholesomeness of the fish is not impaired but the appearance of the fish is materially impaired and the adherence of the fish to the cans and to each other is highly unsatisfactory and detrimental from a commercial standpoint.

It has been discovered that by subjecting the fish to a bath containing certain substances in solution, the skins of the fish may be rendered firm and non-adherent to each other or to the containers. Moreover, it has been discovered that by subjecting the fish to the action of a hardening bath, the exudation of the glue-containing juices from the fish during the cooking and/or sterilization operation is substantially prevented, whereby the fish are prevented from sticking to one another or to the containers, thereby permitting their removal in a perfect condition.

An object of this invention is to disclose and provide a method of treating fish for canning purposes, whereby the skins of the fish are rendered firm and adherence of the skins of adjoining packed fish is substantially prevented.

Another object of this invention is to disclose and provide a method of treating fish for canning purposes whereby its alimentary value and quality are retained and at the same time the skins of the fish are rendered firm and non-adherent.

A further object of the invention is to disclose and provide a method of treating fish whereby the exudation of mucilaginous and gluey components during cooking and sterilizing operations is substantially prevented.

A still further object of the invention is to disclose and provide a method of preparing fish for canning purposes, whereby the adherence of the fish to one another and to the cans as a result of cooking or sterilization operations, is substantially prevented.

These and other objects, uses and advantages of this invention will become apparent to those skilled in the art from the following detailed description of a preferred form of the invention, it being understood that numerous changes and modifications can be made in the process of the invention and in the materials employed, such variations being often necessitated by variation in the kind and quality, as well as the fat content, of the fish.

In applying this invention to the treatment of sardines, the fish are cleaned and then brought in contact with a brine, preferably at atmospheric temperature for the purpose of removing blood and offal. A brine of from about 20° to 50° salinometer is suitable for this purpose. The fish may be either sprayed with this brine or immersed therein for a period of from about ½ to 3 hours, or even longer.

The fish, after having had blood, etc., removed therefrom, are then placed into a brine solution containing a hardening agent. It has been found that a number of different substances may be used as hardening agents, among them being acetic acid, tartaric acid, citric acid, calcium chloride, calcium citrate, and mixtures thereof. A brine of 20° to 50° salinometer containing between 1% to 5% of calcium chloride, and preferably from 2% to 3% calcium chloride has been found to be very suitable. 2% to 5% of calcium citrate in such brine also exerts the desired effect upon the skins. When dilute acetic acid is used, ½% to 1% appears to be sufficient. In all events, the quantity of hardening agent added to the hardening bath and the time of immersion of the fish therein, are so related and regulated as to prevent the development of any undesired flavor in the fish.

The hardening bath described hereinabove is preferably maintained at atmospheric temperature and the fish are allowed to stand therein until the skins have become sufficiently firm to permit handling without bruising. Normally, an immersion of from 1 to 6 hours is sufficient, this time of immersion varying with the concentration of the hardening agent present in the brine and with the quality of the fish.

After subjecting the fish to the hardening bath described hereinabove, the fish are strained and if desired sprayed with a simple brine. The fish may then be placed in the containers such as cans, covered with oil, tomato sauce or other condiment, the containers evacuated and sealed, and the sealed containers then subjected to a sterilizing or cooking operation.

It will be found that the exudation of the gelatinous and gluey juices from the skins during such sterilization and/or cooking will not cause the fish to adhere to one another or to the cans. As a result, the ultimate consumer is able to remove and extract the fish from the containers without bruising their skin.

It is to be noted that the above process permits the cooking of the fish in their container, thereby obviating the somewhat unsanitary cooking operation in oil heretofore practiced when very fat fish are being treated. However, the above process may include a drying step subsequent to the immersion of the fish in the special hardening brine. In other words, after the fish have been cleaned, washed with salt brine and then immersed in the hardening brine, the fish may be passed through a dryer and subjected to the action of heated gases and/or steam for the purpose of extracting some of the oil from the fish. The temperatures during such drying operation may vary from about 90° F. to 250° F., although temperatures of about 150° F. to 190° F. are preferred. Moreover, in such drying, it is desirable to pass a current of the steam or heated air over and through the fish, thereby subjecting the fish to what may be called a gas extraction. When steam is used, the preferred mode of drying is to first dry in a moist atmosphere containing steam and then decrease the steam gradually, the fish passing from an atmosphere of saturated steam into a perfectly dry atmosphere. The initial steam treatment induces capillary attraction so that the glue-containing juices come to the outside of the fish and are dried.

In a specific embodiment of this invention, sardines are cleaned, then soaked in a 20° brine for 2 hours and then soaked in a hardening brine of 50° for a period of 2 hours. 1% of vinegar by weight of the brine was added to this second hardening brine. The canned fish resulting from this series of treatments were in excellent condition as far as appearance, flavor, firmness and color were concerned. Similar treatments were made with a hardening brine which contained only 0.33% of added vinegar as well as with a hardening brine which contained vinegar and 3% calcium chloride. In all instances the condition of the fish was greatly improved over the condition of a similar batch of fish which were merely brined in a 20° brine for 2 hours and then packed.

The use of the hardening brine does not appear to appreciably affect the chemical analysis of the fish. Neither does the composition of the fish appear to be changed. When vinegar or a dilute acetic acid solution is used in the hardening bath, the packed fish will show a slight increase in the acetic acid content, that is, an increase of from say 0.36% to 0.42% or at most 0.48%. The salt content of the fish is increased about 1%.

The hardening brine should be maintained in strength whenever it is used for any protracted length of time. The salinometer readings, for example, will decrease from about 57–50° to 51–48°. The acetic acid content of the hardening brine will decrease but slightly with use but the calcium chloride content of the brine will decrease more rapidly.

As stated hereinabove, a number of different substances may be used in the hardening brine but apparently the lime salts are preferable hardening reagents.

Although a specific sequence of steps under particular conditions has been described in detail hereinabove, it is to be understood that numerous changes and modifications may be made without departing from the invention herein disclosed.

All such changes and modifications as come within the scope of the appended claims are embraced thereby.

We claim:

1. In a method of treating fish for canning purposes, the steps of cleaning the fish, contacting the fish with a salt brine, and then soaking the fish in a brine containing salt and from 1 to 5% of calcium chloride and 0.33% to 1% of vinegar, whereby the skins of the fish are rendered firm and adherence of skins of adjoining packed fish is substantially prevented.

2. In a method of treating fish for canning purposes, the step of soaking cleaned fish in a salt brine of 20 degrees to 50 degrees salinometer containing a skin hardening agent from the group consisting of acetic acid, tartaric acid and citric acid for a period of time of from one to six hours, whereby the skins of the fish are rendered firm.

3. In a method of treating fish for canning purposes, the step of soaking cleaned fish in a salt brine of 20° to 50° salinometer, said brine containing tartaric acid, for a period of time of from one to six hours whereby the skins of the fish are rendered firm.

4. In a method of treating fish for canning purposes, the step of soaking cleaned fish in a salt brine of 20° to 50° salinometer, said brine containing citric acid, for a period of time of from one to six hours, whereby the skins of the fish are rendered firm.

5. In a method of treating fish, the steps of soaking cleaned fish in a salt brine of 20 degrees to 50 degrees salinometer, said salt brine containing a skin hardening agent from the group consisting of acetic acid, tartaric acid and citric acid for a period of time of from one to six hours, whereby the skins of the fish are rendered firm, placing the fish in cans, sealing the cans, and then subjecting the cans to a sterilizing and cooking operation.

6. In a method of treating fish for canning purposes, the step of soaking cleaned fish in a salt brine of 20° to 50° salinometer, said brine containing acetic acid, for a period of time of from 1 to 6 hours, whereby the skins of the fish are rendered firm and adherence of skins of adjoining packed fish is substantially prevented.

CHARLES S. ASH.
PER BERGLUND.